(12) United States Patent
Kasuga

(10) Patent No.: US 9,568,184 B2
(45) Date of Patent: *Feb. 14, 2017

(54) LIGHTING EQUIPMENT AND IMAGE PROJECTOR

(71) Applicant: SEIKO EPSON CORPORATION, Tokyo (JP)

(72) Inventor: Hirofumi Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 14/365,580

(22) PCT Filed: Dec. 12, 2012

(86) PCT No.: PCT/JP2012/007954
§ 371 (c)(1),
(2) Date: Jun. 13, 2014

(87) PCT Pub. No.: WO2013/088716
PCT Pub. Date: Jun. 20, 2013

(65) Prior Publication Data
US 2014/0347266 A1    Nov. 27, 2014

(30) Foreign Application Priority Data

Dec. 15, 2011   (JP) .................. 2011-274156

(51) Int. Cl.
*G06F 3/00* (2006.01)
*F21V 33/00* (2006.01)
(Continued)

(52) U.S. Cl.
CPC ....... *F21V 33/0052* (2013.01); *F21V 33/0056* (2013.01); *G03B 21/142* (2013.01);
(Continued)

(58) Field of Classification Search
CPC .................. G09G 3/3406; G09G 2320/0646; G09G 2360/16; G09G 2330/021; G09G 2320/064

See application file for complete search history.

(56) References Cited

U.S. PATENT DOCUMENTS 1,496,409 A   6/1924  Dilione, Jr.
5,541,820 A   7/1996  McLaughlin
(Continued)

FOREIGN PATENT DOCUMENTS

CN   201887869 U     6/2011
JP   06-180447   *   6/1994
(Continued)

*Primary Examiner* — Md Saiful A Siddiqui
(74) *Attorney, Agent, or Firm* — Maschoff Brennan

(57) ABSTRACT

An lighting equipment having an illumination capability and an image projection capability includes a light source unit (110) that functions as a light source for illumination and a light source for image projection, an image formation unit (120) that modulates light from the light source unit based on image information for illumination or image information for image projection to form an image, a projection unit including a lens (130) that projects the image formed by the image formation unit on a projection surface, a control unit (170) that controls the light source and the image projection unit, and a connection unit (200) electrically connectable to an existing lighting equipment attachment member (300).

8 Claims, 8 Drawing Sheets

(51) Int. Cl.
*G03B 21/14* (2006.01)
*G03B 29/00* (2006.01)
*G03B 21/20* (2006.01)
*G03B 31/00* (2006.01)

(52) U.S. Cl.
CPC ....... *G03B 21/145* (2013.01); *G03B 21/2053* (2013.01); *G03B 29/00* (2013.01); *G03B 31/00* (2013.01); *G06F 3/005* (2013.01)

(56) References Cited

U.S. PATENT DOCUMENTS

| | | | |
|---|---|---|---|
| 6,439,723 B1* | 8/2002 | Tano | G03B 21/00 353/15 |
| 6,592,228 B1* | 7/2003 | Kawashima | G03B 21/11 353/69 |
| 6,869,208 B2 | 3/2005 | Vogel et al. | |
| 6,904,451 B1* | 6/2005 | Orfitelli | H04L 67/125 709/203 |
| 7,871,192 B2 | 1/2011 | Chien | |
| 8,636,389 B2 | 1/2014 | Knappschneider | |
| 9,039,234 B2* | 5/2015 | Kasuga | F21K 9/135 362/257 |
| 2006/0203212 A1 | 9/2006 | Held | |
| 2007/0046902 A1 | 3/2007 | Yajima | |
| 2007/0182443 A1 | 8/2007 | Funada | |
| 2008/0062684 A1 | 3/2008 | Belliveau et al. | |
| 2009/0295712 A1* | 12/2009 | Ritzau | G06F 1/1626 345/156 |
| 2010/0128228 A1* | 5/2010 | Matsuo | G03B 21/14 353/34 |
| 2010/0208216 A1* | 8/2010 | Hirabayashi | G03B 21/14 353/85 |
| 2010/0289664 A1 | 11/2010 | Mizushima et al. | |
| 2010/0315602 A1* | 12/2010 | Takahashi | H04N 9/3185 353/70 |
| 2010/0315605 A1 | 12/2010 | Arita | |
| 2011/0151926 A1* | 6/2011 | Kim | H04N 5/74 455/556.1 |
| 2011/0157487 A1* | 6/2011 | Akeyama | G03B 5/02 348/759 |
| 2011/0164192 A1* | 7/2011 | Ozawa | G03B 21/14 348/744 |
| 2011/0169746 A1 | 7/2011 | Kitajima | |
| 2011/0169764 A1 | 7/2011 | Miyoshi | |
| 2011/0175934 A1* | 7/2011 | Paulussen | H04N 9/315 345/690 |
| 2011/0216047 A1* | 9/2011 | Ozawa | G09G 5/00 345/204 |
| 2012/0081005 A1 | 4/2012 | Lin et al. | |
| 2012/0140128 A1* | 6/2012 | Lin | G02F 1/13471 349/13 |
| 2013/0002687 A1 | 1/2013 | Conti | |
| 2014/0043544 A1 | 2/2014 | Kasuga | |
| 2014/0198949 A1 | 7/2014 | Garlington et al. | |
| 2014/0347266 A1 | 11/2014 | Kasuga | |

FOREIGN PATENT DOCUMENTS

| | | |
|---|---|---|
| JP | 07-264527 A | 10/1995 |
| JP | 08-163476 A | 6/1996 |
| JP | 2005-099588 A | 4/2005 |
| JP | 2006-086024 A | 3/2006 |
| JP | 2006-127845 A | 5/2006 |
| JP | 2006-227143 A | 8/2006 |
| JP | 2007-073438 A | 3/2007 |
| JP | 2007-241261 A | 9/2007 |
| JP | 2008-096739 A | 4/2008 |
| JP | 2008-185757 A | 8/2008 |
| JP | 2009-064109 A | 3/2009 |
| JP | 2009-086368 A | 4/2009 |
| JP | 2009-146798 A | 7/2009 |
| JP | 2009-193008 A | 8/2009 |
| JP | 2011-095309 A | 5/2011 |
| TW | 200632509 A | 9/2006 |
| WO | 2010/044204 A1 | 4/2010 |

* cited by examiner

Fig. 2
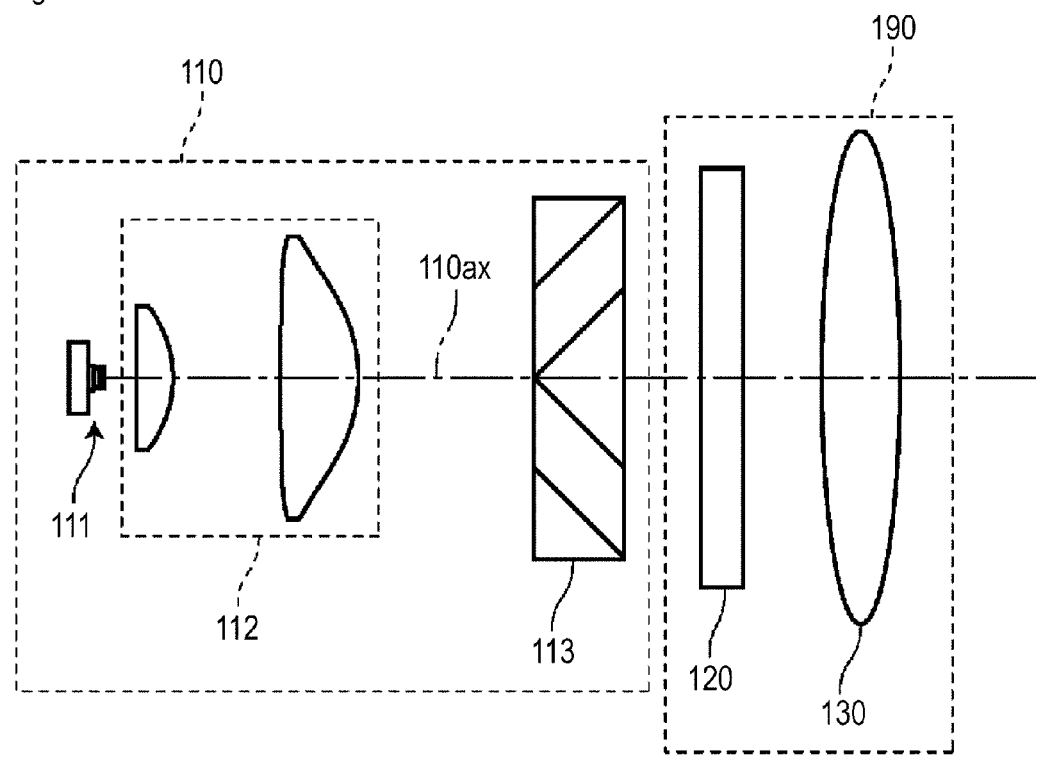
[Fig. 3]
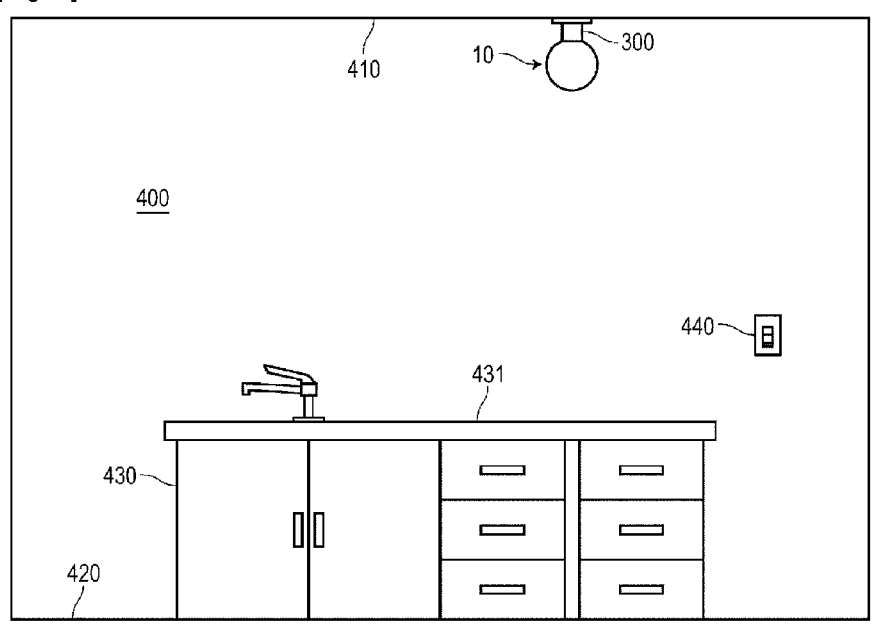

LIGHTING EQUIPMENT AND IMAGE PROJECTOR

CROSS REFERENCE TO RELATED APPLICATIONS

The entire disclosure of Japanese Patent Application No. 2011-274156, filed Dec. 15, 2011 is expressly incorporated by reference herein.

TECHNICAL FIELD

The present invention relates to an lighting equipment having an illumination capability and an image projection capability.

BACKGROUND ART

An lighting equipment having an illumination capability and an image projection capability has been known (see PTL 1 and PTL 2, for example).

Lighting equipments disclosed in PTL 1 and PTL 2 (hereinafter referred to as lighting equipment of related art) are so configured that a projector as an image projection apparatus is provided on an inner wall surface of a globe provided in the lighting equipment and the projector can project an image under the condition that a light source for illumination is off.

CITATION LIST

Patent Literature

[PTL 1]
JP-A-2006-127845
[PTL 2]
JP-A-2006-86024

SUMMARY OF INVENTION

Technical Problem

Each of the lighting equipments of related art, however, in which the projector is disposed by using the globe, can be formed on the precondition that an lighting equipment including a globe is used, which disadvantageously limits the type of lighting equipment useable to form an lighting equipment having an illumination capability and an image projection capability.

Further, since each of the lighting equipments of related art is so configured that the projector as an image projection apparatus is incorporated separately from the light source for illumination, the light source for illumination and a light source for the projector are individually present, resulting in a large number of components in the lighting equipment as a whole, which disadvantageously increases the price and weight of the lighting equipment.

Solution to Problem

An advantage of some aspects of the invention is to provide an lighting equipment having an illumination capability and an image projection capability under the condition that the type of useable lighting equipment is not greatly limited and the configuration of the lighting equipment can be simplified.

[1] An aspect of the invention is directed to an lighting equipment having an illumination capability and an image projection capability and including a light source unit that functions as a light source for illumination and a light source for image projection, an image formation unit that modulates light from the light source unit based on image information for illumination or image information for image projection to form an image, a projection unit including a lens that projects the image formed by the image formation unit on a projection surface, a control unit that controls the light source and the image projection unit, and a connection unit electrically connectable to an existing lighting equipment attachment member.

Since the lighting equipment according to the aspect of the invention is configured to accommodate a component necessary for image projection in the lighting equipment, an lighting equipment having an illumination capability and an image projection capability can be formed irrespective of whether or not a globe or any other similar component is provided. The limitation on the type of lighting equipment useable as an lighting equipment having an illumination capability and an image projection capability can therefore be reduced. Further, in the lighting equipment according to the aspect of the invention, the light source in the light source unit functions as a light source for illumination and a light source for image projection. It is therefore unnecessary to individually provide a light source for illumination and a light source for image projection, whereby the configuration can be simplified and lightweight.

Further, since the lighting equipment according to the aspect of the invention includes the connection unit, which allows the lighting equipment to be attached to an existing lighting equipment attachment member, the lighting equipment according to the aspect of the invention can be attached in the same manner as in a case where an incandescent lamp, a bulb-shaped fluorescent lamp, a bulb-shaped LED lamp and the like are attached. A typical user can therefore readily attach the lighting equipment according to the aspect of the invention to a desired location without relying on an expert.

[2] In the lighting equipment according to the aspect of the invention, it is preferable that, when the light source functions as the light source for illumination and an image projection instruction from a user is detected, the control unit controls the image projection unit to project an image.

The configuration described above allows the function of the lighting equipment according to the aspect of the invention to be readily switched from illumination to image projection.

[3] In the lighting equipment according to the aspect of the invention, it is preferable that the lighting equipment further includes a distance measurement unit capable of measuring the distance to the projection surface.

Since the distance measurement unit described above is provided, an image can be projected in accordance with the distance to an image display surface that is measured by the distance measurement unit.

[4] In the lighting equipment according to the aspect of the invention, it is preferable that the lens is expandable when a voltage is applied thereto to change the focal length thereof, and the control unit adjusts the focal length of the lens by applying a voltage according to the distance to the projection surface that is measured by the distance measurement unit.

The configuration described above allows the focal length of the lens to be automatically adjusted in accordance with the distance to the image projection surface, whereby a clear image can be projected on the projection surface without user's adjustment.

[5] In the lighting equipment according to the aspect of the invention, it is preferable that the lighting equipment further includes an imaging unit capable of capturing an image of an instruction action performed by a user, and the control unit performs control corresponding to the instruction action performed by the user based on captured image data outputted from the imaging unit.

The configuration described above allows the user to perform a various types of control on the lighting equipment according to the aspect of the invention without directly touching the lighting equipment according to the aspect of the invention. An exemplary instruction action performed by the user includes user's action (gesture) of waving a hand of the user rightward and leftward predetermined times. The control described above is achieved by relating user's instruction actions to control actions.

[6] In the lighting equipment according to the aspect of the invention, it is preferable that the lighting equipment further includes an audio output unit capable of outputting audio.

The configuration described above allows the lighting equipment not only to project an image but also to output audio, whereby the application of the lighting equipment according to the aspect of the invention can be diversified.

[7] In the lighting equipment according to the aspect of the invention, it is preferable that the control unit has a function of acquiring image information corresponding to an image to be projected over a network.

The configuration described above allows the lighting equipment to project a variety of image. For example, the lighting equipment capable of acquiring information present in a Web site can readily display necessary information.

[8] In the lighting equipment according to the aspect of the invention, it is preferable that the control unit has a function of projecting a selection screen that allows a user to select the type of image to be projected.

The configuration described above allows the lighting equipment to display information in a various types of fields, whereby the application of the lighting equipment according to the aspect of the invention can be diversified.

[9] In the lighting equipment according to the aspect of the invention, it is preferable that the lighting equipment connection member is one of a bulb attachment socket, a bulb attachment receptacle, a hooking rosette, and a hooking ceiling.

By employing a configuration in which a connection unit corresponding to any of the lighting equipment attachment members described above is attached to the lighting equipment according to the aspect of the invention, the lighting equipment according to the aspect of the invention can be readily attached as in a case where a typical lighting equipment is attached. Further, since the lighting equipment according to the aspect of the invention can be removed in a simple removal operation, the user can readily change the location where the lighting equipment is attached.

BRIEF DESCRIPTION OF DRAWINGS

FIG. 2 diagrammatically shows the configuration of an optical system of the lighting equipment according to the first embodiment.

FIG. 3 describes an example of attachment of the lighting equipment according to the first embodiment.

DESCRIPTION OF EMBODIMENTS

Lighting equipments according to embodiments of the invention will be described below.

First Embodiment

Figure 1:
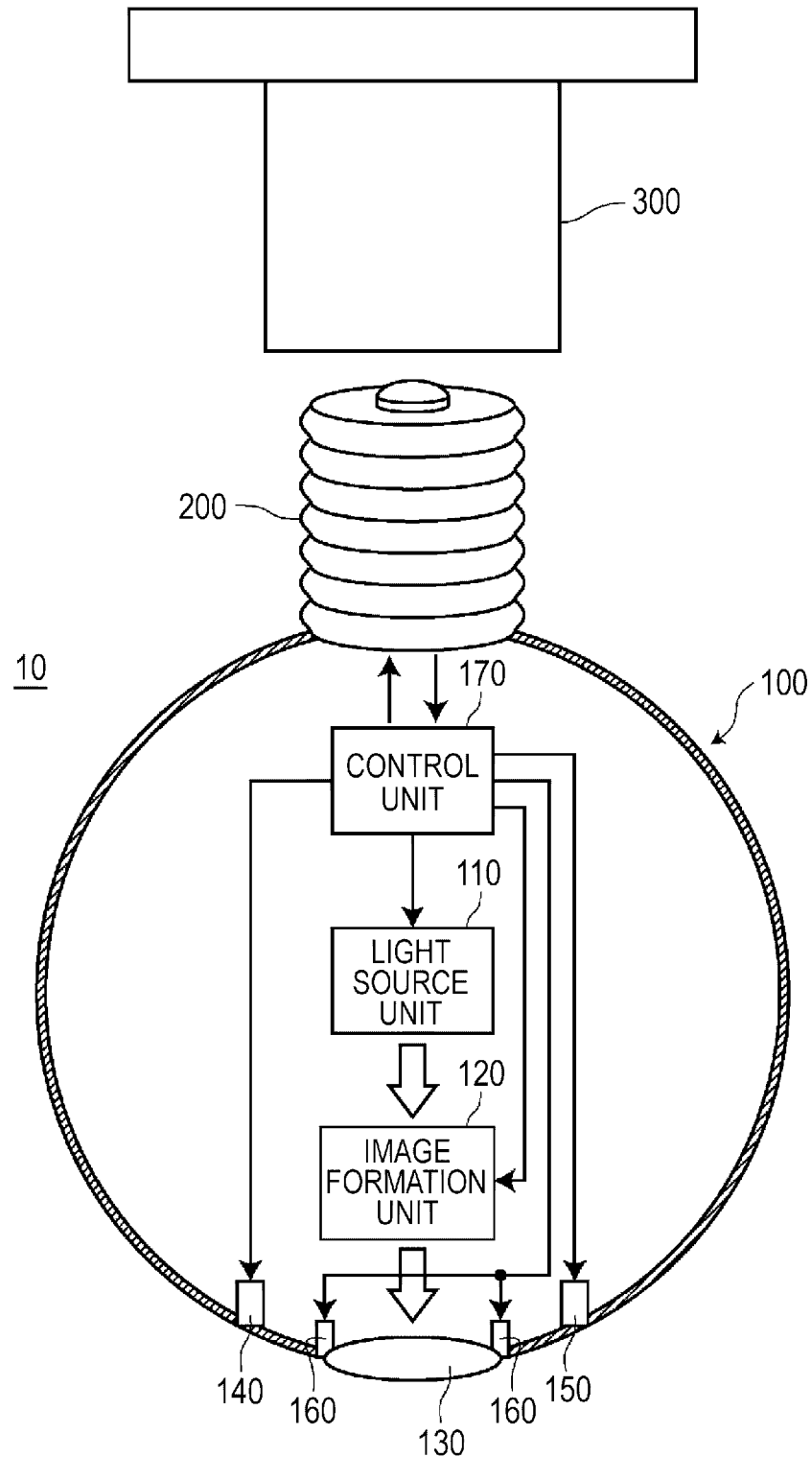
FIG. 1 diagrammatically shows the configuration of an lighting equipment according to a first embodiment.

FIG. 1 diagrammatically shows the configuration of an lighting equipment 10 according to a first embodiment. In FIG. 1, the solid-line arrows represent the flow of an electric signal, and the open arrows represent the travel of light.

The lighting equipment 10 according to the first embodiment is an lighting equipment having an exterior configuration including an lighting equipment body 100 and a connection unit (referred to as connection member in some cases) 200 by which the lighting equipment body 100 is connected to an existing lighting equipment attachment member (bulb attachment receptacle or bulb attachment socket, for example) 300, as shown in FIG. 1.

The lighting equipment body 100 includes a light source unit 110, an image formation unit 120, a lens 130 that projects an image formed by the image formation unit 120 on a projection surface, a distance measurement unit 140 that can measure the distance from the lighting equipment body 100 to the projection surface, an imaging unit 150 that can capture an image of an instruction action (which will be described later) performed by a user, electrodes 160 through which a voltage is applied to the lens 130, and a control unit 170. Each of the above components will be described later in derail.

It is assumed in the lighting equipment 10 according to the first embodiment that the connection member 200 is similar to a base with which an incandescent lamp, a bulb-shaped fluorescent lamp, and a bulb-shaped LED lamp are provided. The lighting equipment 10 according to the first embodiment can therefore be connected to a bulb attachment receptacle or a bulb attachment socket by screwing the base into the bulb attachment receptacle or the bulb attachment socket, which is an example of the lighting equipment attachment member 300, as in the case of an incandescent lamp, a bulb-shaped fluorescent lamp, a bulb-shaped LED lamp and the like.

FIG. 2 diagrammatically shows the configuration of an optical system of the lighting equipment 10 according to the first embodiment. The optical system of the lighting equipment 10 according to the first embodiment is formed of the light source unit 110, the image formation unit 120, and the lens 130 as a projection lens, as shown in FIG. 2. The image formation unit 120 is formed of a liquid crystal light modulator and hereinafter also referred to as a liquid crystal light modulator 120. As described above, the optical system of the lighting equipment 10 according to the first embodiment is configured in substantially the same manner as a single-panel liquid crystal projector. A combination of the liquid crystal light modulator 120 and the lens 130 is referred to as an image projection unit 190.

The light source unit 110 includes a light source 111 (which is assumed to be white light emitting diode), a collimator system 112, and a polarization converter 113. The light source 111, although not described herein in detail, emits light containing red light, green light, and blue light. Further, the light source 111 functions as a light source for illumination and a light source of the image projection unit 190.

The collimator system 112 is an optical element that parallelizes light emitted from the light source 111. The polarization converter 113 is an element that converts the polarization direction of the light passing through the collimator system 112. The polarization converter 113 includes a polarization separation layer that processes light incident thereon in such a way that the incident light is separated into two linearly polarized components: one of the linearly polarized components that directly passes through the polarization separation layer; and the other one of the linearly polarized components that is reflected off the polarization separation layer in the direction perpendicular to an illumination optical axis 110ax, a reflection layer that reflects the other linearly polarized component having been reflected off the polarization separation layer in the direction parallel to the illumination optical axis 110ax, and a retardation film that converts the other linearly polarized component having been reflected off the reflection layer into the one linearly polarized component.

The liquid crystal light modulator 120 is a light modulator that modulates the light from the light source unit 110 in accordance with image information to be projected and outputs resultant full-color image light. The liquid crystal light modulator 120 has a color filter (not shown). The color filter is formed of a Bayer-layout color filter having reflective dichroic filters and has a function as a color separation system that separates the light from the light source unit 110 into red light, green light, and blue light on a pixel basis. The color separation system may be formed of any other suitable color separation system.

The liquid crystal light modulator 120 further includes a light-incident-side polarizer (not shown) disposed on the side where the polarization converter 113 is present and a light-exiting-side polarizer (not shown) disposed on the side where the lens 130 is present. The configuration described above allows light modulation for each of the color components.

The lens 130 is expandable (changeable in width) in accordance with the magnitude of a voltage applied to the electrodes 160 (see FIG. 1) for focal length adjustment (referred to as focus adjustment). A lens of this type is well known, and some lenses each have a width that changes by a value ranging, for example, from 750 to 375 micrometers when a voltage of 20 volts is applied to the electrodes.

Using the lens 130 described above as a projection lens allows an image formed by the liquid crystal light modulator 120 to be enlarged and projected on the projection surface. When the lighting equipment 10 according to the first embodiment is used, for example, in a kitchen (see FIGS. 3 and 4), an upper surface 431 of a cooking table 430 or the like can be the projection surface.

The distance measurement unit 140 measures the distance from the lighting equipment body 100 to the projection surface, and distance data outputted from the distance measurement unit 140 is sent to the control unit 170. The imaging unit 150 is so disposed that it can capture an image of an instruction action (which will be described later) performed by the user, and imaged data outputted from the imaging unit 150 is sent to the control unit 170.

The control unit 170 has not only a function of controlling the light source 111 in the light source unit 110, the liquid crystal light modulator 120, the lens 130, the distance measurement unit 140, and the imaging unit 150 but also a Web information acquisition function that allows acquisition of information present in a Web site, a communication function that allows reception of television broadcasting (hereinafter referred to as TV broadcasting) or the like, and other similar functions. The control unit 170 includes a storage unit (not shown).

In the thus configured lighting equipment 10, the light source unit 110, the image formation unit 120, and the lens 130 are arranged along a single straight line. When the lighting equipment 10 performs the illumination capability, the image projection unit 190 projects a white image.

FIG. 3 describes an example of attachment of the lighting equipment 10 according to the first embodiment. FIG. 3 shows attachment of the lighting equipment 10 in a kitchen 400 in a typical dwelling. The lighting equipment attachment member 300 is a bulb attachment receptacle (hereinafter abbreviated to receptacle 300) originally attached to a ceiling 410 of the kitchen 400, and the lighting equipment 10 is attached to the receptacle 300 by screwing the connection member 200 (see FIG. 1) into the receptacle 300. Further, the lighting equipment 10 is so attached that the lighting equipment 10 can project an image in a predetermined range G (also referred to as projection range G) (see FIG. 4) on the upper surface 431 of the cooking table 430 installed on a floor 420 of the kitchen 400 and that the lighting equipment 10 can illuminate a predetermined range including the projection range G.

When a power switch is turned on, the light source 111 in the light source unit 110 goes on first and the lighting equipment 10 performs the illumination capability. The power switch used herein is not a switch provided on the lighting equipment 10 but is a switch (referred to as main switch) 440 (see FIG. 3) provided, for example, on a wall of a room where the lighting equipment 10 is installed.

Figure 4:
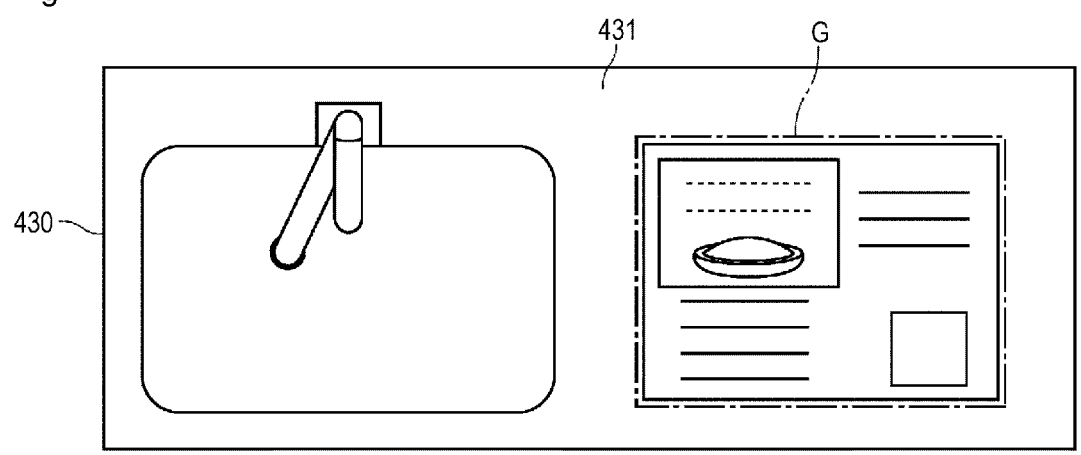
FIG. 4 shows an example of projection in which the lighting equipment according to the first embodiment projects an image on an upper surface of a cooking table.

FIG. 4 shows an example of projection in which the lighting equipment 10 according to the first embodiment projects an image on the upper surface 431 of the cooking table 430. As shown in FIG. 4, a recipe for a desired preparation is, for example, projected in the projection range G on the upper surface 431 of the cooking table 430. Such a recipe can be acquired, for example, from a Web site. A cook can cook the preparation while seeing the recipe projected within the projection range G.

Figure 5:
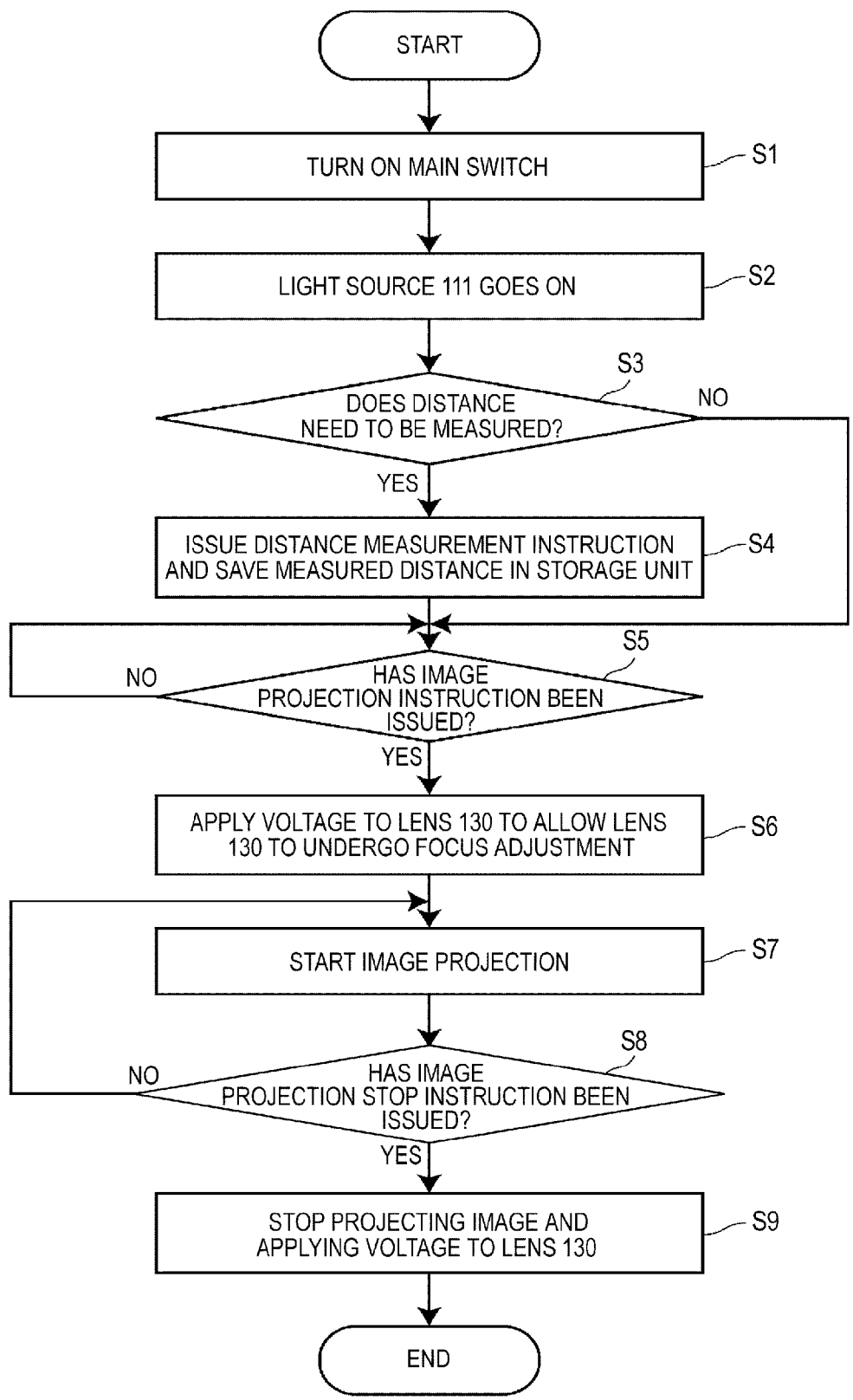
FIG. 5 is a flowchart for describing basic operation of the lighting equipment according to the first embodiment.

FIG. 5 is a flowchart for describing basic operation of the lighting equipment 10 according to the first embodiment. The flowchart shown in FIG. 5 primarily describes the operation of the control unit 170 of the lighting equipment 10 and also contains part of user's operation.

When the user turns on the main switch 440 (step S1), the light source 111 in the light source unit 110 goes on (step S2). When the control unit 170 detects that the light source 111 has gone on, the control unit 170 instructs the image projection unit 190 to project a white image at this point. As a result, the projection range G is illuminated with white light containing no image. In this state, the lighting equipment 10 according to the first embodiment performs the illumination capability.

The focus adjustment made by the lens 130 can be used not only when an image is projected but also when an object is illuminated. For example, suppose a case where the focusing adjustment is so made by the lens 130 that the area over which the illumination light spreads (diffuses) is maximized. In this case, the light radiated from the lighting equipment body 100 can illuminate an area larger than the projection range G, which is very convenient to carry out a series of work. Conversely, when the focus adjustment is so made by the lens 130 that the light is projected within the projection range G, the light radiated from the lighting equipment body 100 can have a spotlight-like shape, which is very convenient to carry out fine works. As described above, even when the lighting equipment 10 performs the illumination capability, the degree of spread, the uniformity, and other attributes of the illumination light can be adjusted based on the focus adjustment made by the lens 130.

In the state in which the lighting equipment 10 performs the illumination capability, the control unit 170 determines whether or not the distance to the projection surface needs to be measured (step S3). When the control unit 170 determines that the distance measurement needs to be made ("Yes" in step S3), an instruction to make the distance measurement is issued to the distance measurement unit 140, and distance data measured by the distance measurement unit 140 is saved in the storage unit (not shown) (step S4). At this point, the control unit 170 switches to a state in which it waits an image projection start instruction, and determines whether or not the image projection start instruction has been issued in the state in which the control unit 170 waits the image projection start instruction (step S5).

In step S3 described above, the reason why the control unit 170 determines whether or not the distance measurement needs to be made is that when the distance between the lighting equipment body 100 and the projection surface is fixed, and after the distance measurement is made once, no more distance measurement is required or the following distance measurement can be omitted. Whether or not the distance measurement needs to be made can be determined based on whether or not measured distance data has been saved in the storage unit. When the control unit 170 determines that no distance measurement needs to be made in step S3 ("No" in step S3), the control unit 170 outputs no distance measurement instruction to the distance measurement unit 140 and proceeds to the process in step S5.

When the user issues the image projection start instruction ("Yes" in step S5) at this point, the control unit 170 applies a predetermined voltage to the lens 130 based on the distance data saved in the storage unit to allow the lens 130 to undergo focus adjustment (step S6) and starts image projection (step S7). Since an image projected within the projection range G is projected through the lens having undergone the focus adjustment in accordance with the distance to the projection surface, a clear image is projected.

The user issues the image projection start instruction by performing a predetermined action (gesture) under the lighting equipment body 100. For example, the user waves a hand of the user twice rightward and leftward. The imaging unit 150 captures an image of the action performed by the user, and the imaged data is sent to the control unit 170, which identifies what action the user has performed based on the imaged data and performs control corresponding to the result of the identification. The control described above can be performed by relating user's instruction actions to control actions.

In the state in which the lighting equipment 10 performs the image projection capability, the control unit 170 switches to a state in which it waits an image projection stop instruction and determines whether or not the image projection stop instruction has been issued in the state in which the control unit 170 waits the image projection stop instruction (step S8). To issue the image projection stop instruction, the user performs a predetermined action under the lighting equipment body 100 in the same manner as in the case where the user issues the image projection start instruction. For example, the user waves a hand of the user four times rightward and leftward.

The imaging unit 150 captures an image of the action performed by the user, and the imaged data is sent to the control unit 170, which identifies what action the user has performed based on the imaged data and performs control corresponding to the result of the identification. When the control unit 170 determines the user's action as the image projection stop instruction ("Yes" in step S8), the image projection is terminated and the voltage application to the lens 130 is terminated (step S9). The lighting equipment 10 then switches to the state in which it performs the illumination capability.

As described above, in the lighting equipment 10, since the image projection unit 190 (image formation unit 120 and lens 130) is incorporated in the lighting equipment body 100, an lighting equipment having an illumination capability and an image projection capability can be formed irrespective of whether or not a globe or any other component is provided. The limitation on the type of lighting equipment useable as an lighting equipment having an image projection capability can therefore be reduced.

Further, in the lighting equipment 10, the light source 111 functions as a light source for illumination and a light source for image projection. It is therefore unnecessary to individually provide a light source for illumination and a light source for image projection, whereby the configuration can be simplified and lightweight.

Further, since the lighting equipment 10 includes the connection member 200, which allows the lighting equipment 10 to be electrically connected to the existing lighting equipment attachment member 300, the lighting equipment 10 according to the first embodiment can be attached in the same manner as in a case where an incandescent lamp, a bulb-shaped fluorescent lamp, a bulb-shaped LED and the like are attached. A typical user can therefore readily attach the lighting equipment 10 to a desired location without relying on an expert.

Further, since the user of the lighting equipment 10 can issue a variety of instructions, such as the image projection start instruction and the image projection stop instruction, to the lighting equipment 10 by performing predetermined actions (gestures), the user does not need to directly touch a switch for switching. That is, for example, in the course of cooking, a hand having touched a food material, a hand wet with water, or a hand otherwise contaminated with a substance does not need to come into direct contact with the lighting equipment 10, whereby the lighting equipment will not become dirty or malfunction due to water. Conversely, a food material will not be touched with a hand having touched the lighting equipment, whereby excellent sanitary conditions are ensured.

Further, the lighting equipment 10 includes the lens 130, which can make focus adjustment through voltage application, and a voltage according to the distance to the projection surface is applied to the lens 130 for focus adjustment. When the thus configured lighting equipment 10 according to the first embodiment is used in image projection, an image to be projected on the projection surface can be automatically so adjusted that the image becomes more clear.

Second Embodiment

An lighting equipment 20 according to a second embodiment allows the user to select the type of image to be projected. The configuration of the lighting equipment 20 according to the second embodiment is basically the same as that shown in FIG. 1 but differs therefrom in that audio may be outputted depending on the type of image being projected. To this end, the lighting equipment 20 according to the second embodiment includes an audio output unit (speaker) 180.

Figure 6:
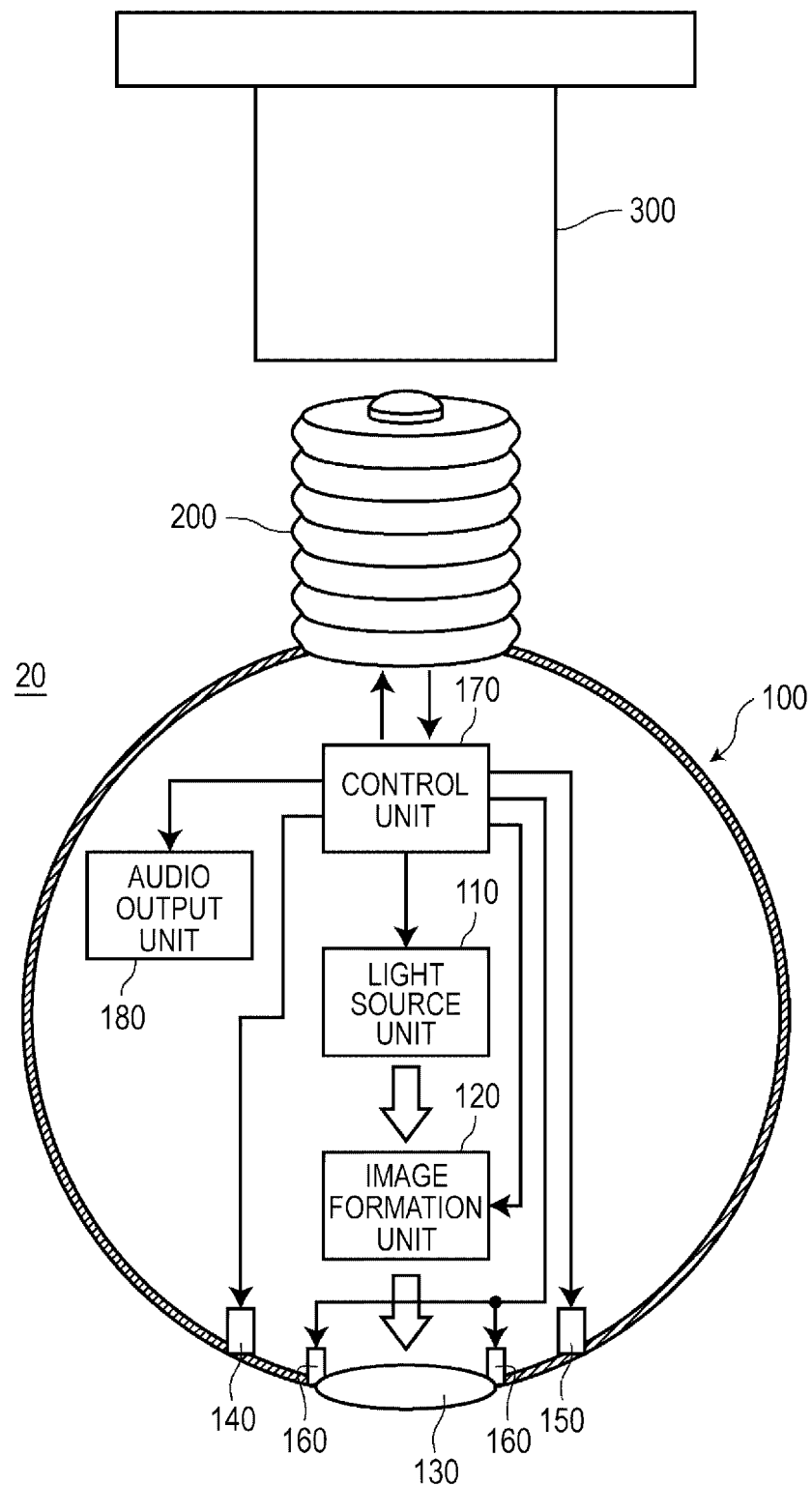
FIG. 6 describes an lighting equipment according to a second embodiment.

FIG. 6 describes the lighting equipment 20 according to the second embodiment. FIG. 6 diagrammatically shows the configuration of the lighting equipment 20, and the arrows shown in FIG. 6 mean as follows: the solid-line arrows represent the flow of an electric signal; and the open arrows represent the travel of light, as in FIG. 1.

The lighting equipment 20 includes the audio output unit 180, as shown in FIG. 6. The lighting equipment 20 is the same as the lighting equipment according to the first embodiment except that the audio output unit 180 is provided, and the same components therefore have the same reference characters. Further, it is assumed that the lighting equipment 20 is attached in the same manner as in FIGS. 3 and 4.

It is assumed that types of images projectable from the lighting equipment 20 include not only information present in a Web site as in the case of the lighting equipment 10 according to the first embodiment but also TV broadcasting and memorandum information. The latter is inputted by the user, for example, through a software keyboard.

Figure 7:
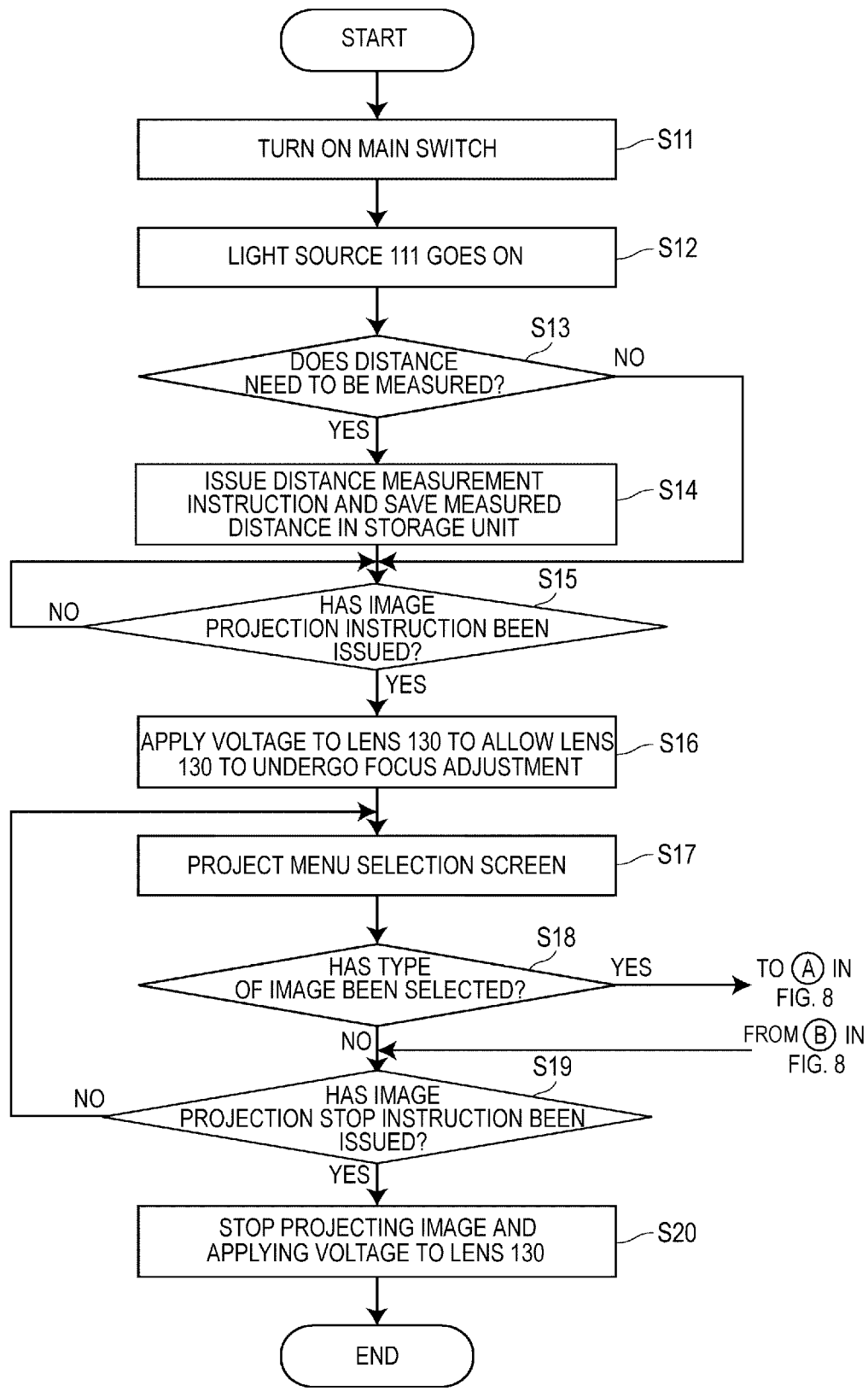
FIG. 7 is a flowchart for describing a series of operations of the lighting equipment according to the second embodiment.

FIG. 7 is a flowchart for describing the operation of the lighting equipment 20. The flowchart shown in FIG. 7 primarily describes the operation of the control unit 170 and also contains part of user's operation, as in the case of the flowchart shown in FIG. 5. Steps S11 to S16 are the same as S1 to S6 in FIG. 5, and no description thereof will therefore be made.

A description will be made of a case where the control unit 170 determines in step S15 that the image projection start instruction has been issued. When the control unit 170 determines that the image projection start instruction has been issued, the focus adjustment is made by the lens 130 (step S16), and then a selection screen that allows the user to select the type of image to be projected (referred to as menu selection screen) is projected (step S17). After the menu selection screen is displayed, the control unit 170 determines whether or not the user has selected the type of image through the menu selection screen (step S18).

When the user selects the type of image ("Yes" in step S18), the control proceeds along a path "A" (see FIG. 8), whereas when the user has selected no type of image ("No" in step S18), it is determined whether or not the image projection stop instruction has been issued (step S19). When it is determined that the image projection stop instruction has been issued, the control proceeds to step S20. Step S20 is the same as step S9 in FIG. 5, and no description thereof will therefore be made.

To select the type of image through the projected menu selection screen, for example, the user performs an action of issuing an instruction with a finger or any other object through the menu selection screen. The imaging unit 150 captures an image of the action performed by the user, and the imaged data is sent to the control unit 170, which can identify what image the user has selected.

Figure 8:
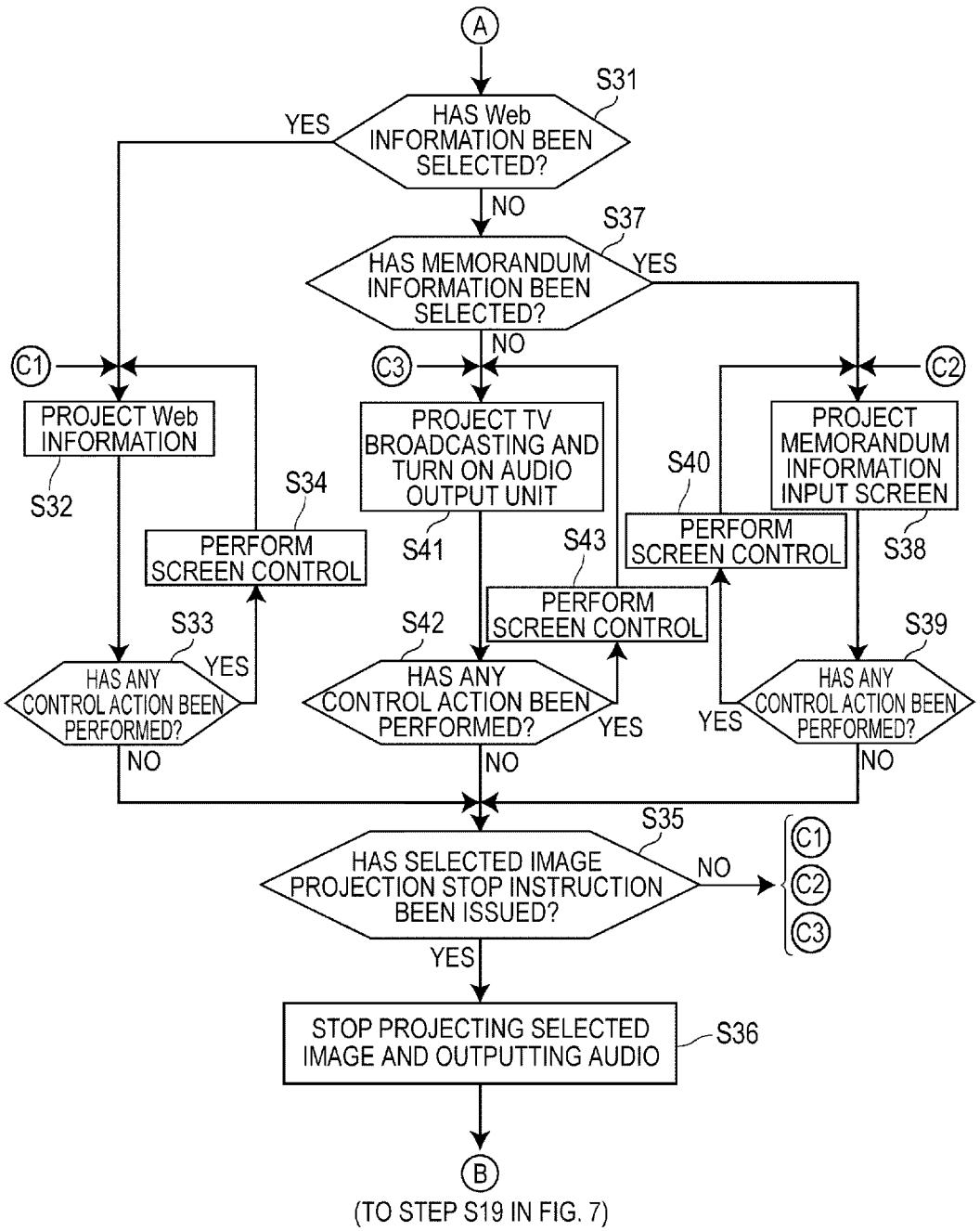
FIG. 8 is a flowchart for describing how processes are carried out after a user selects the type of image through a menu selection screen.

FIG. 8 is a flowchart for describing how processes are carried out after the user selects the type of image through the menu selection screen. In the menu selection screen, the following three types of selectable images are provided: "Web information;" "TV broadcasting;" and "memorandum information." The user can select any of the three types of information sources.

In FIG. 8, it is first determined whether or not the user has selected "Web information" (step S31). When it is determined that the user has selected the Web information ("Yes" in step S31), the Web information selected by the user is projected (step S32). The Web information selected by the user is, for example, a cooking recipe, as in the situation associated with the lighting equipment according to the first embodiment.

After the Web information is projected, it is determined whether or not the user is performing a certain control action (page turning, for example) (step S33). When the user is performing a certain control action ("Yes" in step S33), screen control corresponding to the control action is performed (step S34). The screen control performed in this process is, for example, control in which the pages of the recipe are turned in response to user's page turning action. In this case as well, the imaging unit 150 captures an image of the action performed by the user (page turning). The control unit 170 then identifies user's action based on the imaged data outputted from the imaging unit 150 and performs screen control in which pages of the recipe are turned in response to user's page turning action.

On the other hand, when it is determined that the user has not performed the control action described above ("No" in step S33), it is determined whether or not an instruction to stop projecting the currently projected image, that is, the image selected through the menu selection screen (referred to as selected image), has been issued (step S35).

When it is determined that the selected image projection stop instruction has been issued ("Yes" in step S35), the control unit 170 stops projecting the selected image. When audio is outputted with the selected image, the control unit 170 also stops outputting the audio (step S36). The control then proceeds along a path "B", and it is determined whether or not the image projection stop instruction has been issued (step S19 in FIG. 7). When no selected image projection stop instruction has been issued in step S35 in FIG. 8 ("No" in step S35), the control proceeds along a path "C1" and returns to step S32, and the Web information is kept projected.

On the other hand, when the control proceeds along the path "B" after step S36, it is determined whether or not the image projection stop instruction has been issued in step S19 in FIG. 7. The process of determining whether or not the image projection stop instruction has been issued is a process of determining whether or not the image projection is terminated and the lighting equipment 20 is allowed to perform the illumination capability. When it is determined that the image projection stop instruction has been issued ("Yes" in step S19), the image projection is terminated and the voltage application to the lens 130 is also terminated (step S20). As a result, the lighting equipment 20 performs the illumination capability. On the other hand, when it is determined that no image projection stop instruction has been issued ("No" in step S19), the control returns to step S17, where the user can perform menu selection again.

When it is determined in step S31 in FIG. 8 that the information selected by the user is not "Web information" ("No" in step S31), it is determined whether or not the information selected by the user is "memorandum information" (step S37). When it is determined that the user has selected the memorandum information ("Yes" in step S37), a memorandum information input screen (software keyboard, for example) is projected (step S38).

It is then determined whether or not the user has performed a certain control action (whether or not the user has inputted, for example, a character through the software keyboard, for example) (step S39). When it is determined that a certain control action has been performed ("Yes" in step S39), screen control according to the control action is performed (step S40). The screen control in this case is, for example, control in which the imaging unit 150 captures an image of the character or any other object inputted by the user and the control unit 170 projects memorandum information based on the imaged data outputted from the imaging unit 150.

On the other hand, when it is determined that the user has not performed the control action described above ("No" in step S39), the process in step S35 is carried out. The processes in step S35 and the following steps are the same as those having been described, and no description thereof will therefore be made. When it is determined that no selected image projection stop instruction has been issued in step S35 ("No" in step S35), the control proceeds along a path "C2" and returns to step S38, and the memorandum information input screen is kept projected.

When it is determined in step S37 in FIG. 8 that the information selected by the user is not "memorandum information" ("No" in step S37), TV broadcasting is projected and the audio output unit 180 is activated (turned on) (step S41). It is then determined whether or not the user has performed a certain control action (channel switching, for example) (step S42). When it is determined that a certain control action has been performed ("Yes" in step S42), screen control according to the control action is performed (step S43).

On the other hand, when it is determined that the user has not performed the control action described above ("No" in step S42), the process in step S35 is carried out. The processes in step S35 and the following steps are the same as those having been described, and no description thereof will therefore be made. When no selected image projection stop instruction has been issued in step S35, the control proceeds along a path "C3" and returns to step S41, and the TV broadcasting is kept projected.

As described above, since the type of image to be projected from the lighting equipment 20 can be selected and the selected image can be projected, the usage of the lighting equipment 20 having an image projection capability can be advantageously diversified in addition to the advantageous effect provided by the lighting equipment 10 according to the first embodiment.

The invention has been described with reference to the above embodiments, but the invention is not limited thereto and a variety of variations can be implemented to the extent that they do not depart from the substance of the invention. For example, the following variations are conceivable:

(1) The type, the shape, and other attributes of the lighting equipment body 100, which forms the lighting equipment according to any of the embodiments described above, are not limited to the type and shape of the lighting equipment body shown in the embodiment described above. For example, the lighting equipment body 100 has a spherical shape in the embodiments described above, but the lighting equipment body 100 does not necessarily have a spherical shape and may alternatively have a cylindrical shape, a box-like shape, and a variety of other shapes.

(2) The above embodiments have been described with reference to the case where the lighting equipment according to any of the embodiments of the invention is attached to the ceiling. The lighting equipment is not necessarily attached to the ceiling and may be attached to a wall or a pillar. Still alternatively, instead of installing the lighting equipment on the ceiling, a wall, or a column, the lighting equipment can be used as a hand light. To use the lighting equipment as a hand light, the connection member 200 may be changed to a connection member adaptable to a bulb attachment socket for the hand light.

(3) The above embodiments have been described with reference to the case where the lighting equipment according to any of the embodiments of the invention is attached in a kitchen in a dwelling. The lighting equipment is not necessarily attached in a kitchen and can be attached in a variety of other places, such as a living room, a bedroom, and a study. Further, the lighting equipment can even be attached, for example, in a shop instead of a dwelling.

(4) In each of the embodiments described above, the lighting equipment according to the embodiment of the invention is attached to the lighting equipment attachment member (receptacle) 300 directly attached to the ceiling, but the lighting equipment is not necessarily attached to the receptacle 300. For example, when the lighting equipment attachment member (bulb socket, for example) 300 is suspended from the ceiling with a connection cable, the lighting equipment according to the embodiment of the invention can be attached to the suspended bulb socket.

(5) The above embodiments have been described with reference to the case where the connection member 200 is a connection member (threaded base) connectable to a bulb attachment receptacle or a bulb attachment socket, but the connection member 200 is not limited thereto. For example, in a case where a hooking ceiling or a hooking rosette is attached as the lighting equipment attachment member to the ceiling or any other surface, the connection member 200 may be a connection member connectable to the hooking ceiling or the hooking rosette. In this case, a connection cable may be extended from the lighting equipment body 100, and a connection member connectable to the hooking ceiling or the hooking rosette may be attached to the end of the connection cable.

Figure 9A:
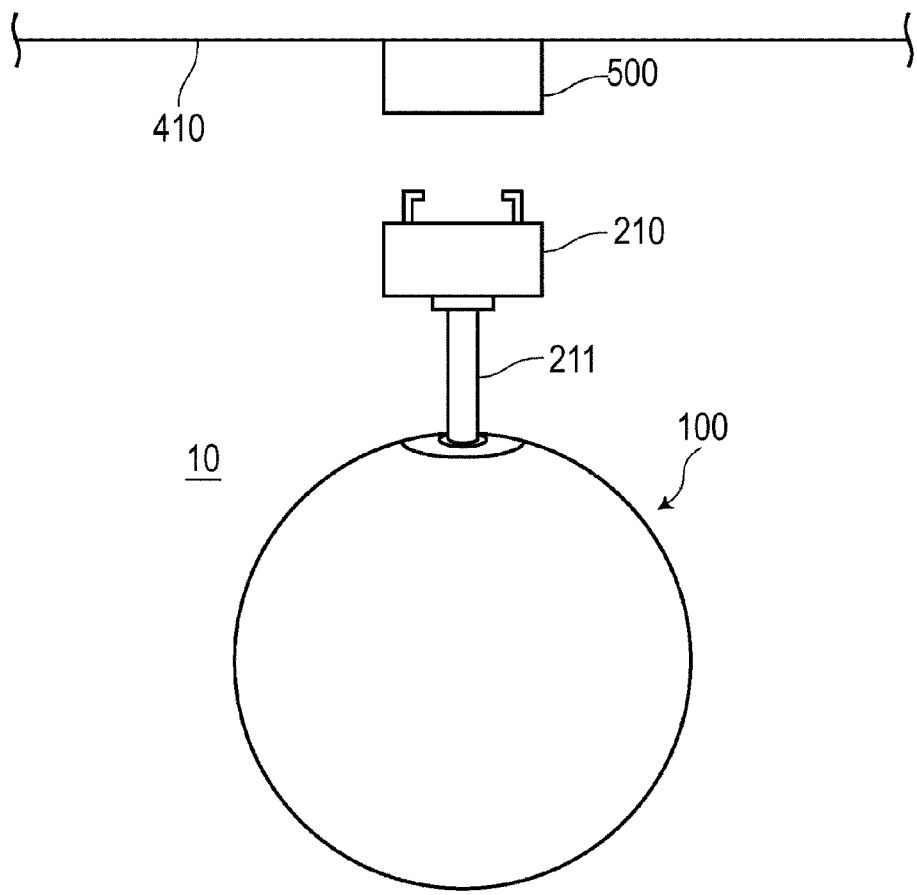
FIG. 9A illustrates a case where an lighting equipment is attached to a hooking ceiling attached to a ceiling.
Figure 9B:
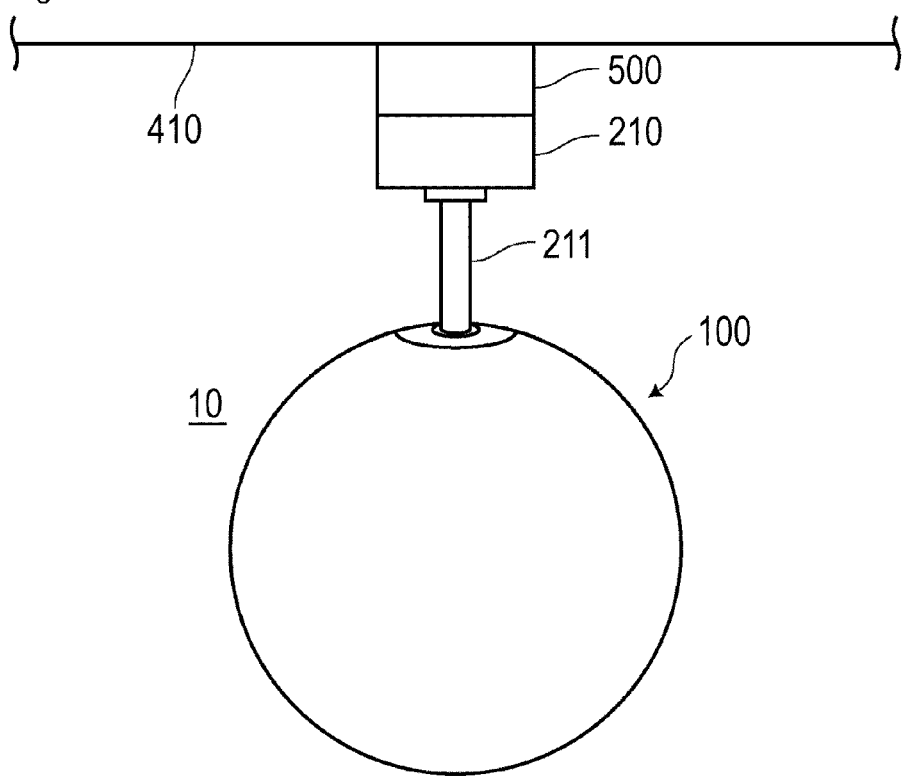
FIG. 9B illustrates a case where an lighting equipment is attached to a hooking ceiling attached to a ceiling.

FIGS. 9A and 9B describe a case where an lighting equipment is attached to a hooking ceiling 500 attached to the ceiling 410. A description will be made of a case where the lighting equipment 10 according to the first embodiment is attached. It is, however, noted that the lighting equipment 20 according to the second embodiment can be attached in the same manner as the lighting equipment 10 according to the first embodiment. In FIGS. 9A and 9B, the internal configuration of the lighting equipment body 100 is omitted.

To attach the lighting equipment 10 to the hooking ceiling 500, a connection member 210 for the hooking ceiling 500 is used as the connection member, as shown in FIGS. 9A and 9B. A connection cable 211 is extended from the lighting equipment body 100, and the connection member 210 for the hooking ceiling 500 is attached to the end of the connection cable 211, as shown in FIG. 9A. The configuration described above allows the connection member 210 for the hooking ceiling to be attached to the hooking ceiling 500 attached to the ceiling 410, as shown in FIG. 9A.

In FIGS. 9A and 9B, the lighting equipment 10 according to the first embodiment is attached to the hooking ceiling 500, but the lighting equipment 10 according to the first embodiment can alternatively be attached to a hooking rosette. In this case, although not shown, a connection member for a hooking rosette may be used as the connection member provided on the side where the lighting equipment 10 is present.

(6) In the embodiments described above, image information to be projected is not limited to Web information, TV broadcasting, or other similar information. For example, image information saved in a personal computer can be projected.

(7) The above embodiments have been described with reference to the case where a liquid crystal light modulator is used as a light modulator in the image formation unit 120, but the light modulator is not limited to a liquid crystal light modulator. The light modulator may alternatively be a digital micromirror device.

(8) The above embodiments have been described with reference to the case where the lighting equipment 10 that performs the illumination capability projects a white image displayed on the liquid crystal light modulator 120 through the image projection unit 190, but a white image is not necessarily displayed. When the lighting equipment 10 performs the illumination capability, the liquid crystal light modulator 120 may be set to be transparent (no image is produced but the modulator stays transparent) or may be mechanically so retracted that the modulator does not overlap with the light source unit 110. The configuration described above more efficiently ensures predetermined brightness.

(9) In each of the embodiments described above, the focus adjustment is so made in the lighting equipment 10 that the thickness of the lens 130 is controlled by applying a voltage to the electrodes 160, but the focus adjustment is not necessarily made this way. The lens 130 may alternatively be provided with a threaded portion, and the focus adjustment may be made by manually screwing the lens 130. The configuration described above allows the number of parts to be reduced, whereby the lighting equipment can be more simplified and more lightweight.

REFERENCE SIGNS LIST 10, 20 Lighting equipment
100 Lighting equipment body
110 Light source unit
111 Light source
112 Collimator system
113 Polarization converter
120 Image formation unit (liquid crystal light modulator)
130 Lens
140 Distance measurement unit
150 Imaging unit
160 Electrode
170 Control unit
180 Audio output unit
190 Image projection unit
200 Connection member
210 Connection member for hooking ceiling
211 Connection cable
300 Lighting equipment attachment member
400 Kitchen
410 Ceiling
430 Cooking table
431 Upper surface of cooking table
500 Hooking ceiling
G Projection range

The invention claimed is:

1. A lighting equipment having an illumination capability and an image projection capability, the lighting equipment comprising:
a light source unit that functions as a light source for illumination and a light source for image projection;
an image projection unit including an image formation unit that modulates light from the light source unit based on image information for illumination or image information for image projection to form an image and a lens that projects the image formed by the image formation unit on a projection surface;
a control unit that controls the light source and the image projection unit; and
a connection unit electrically connectable to a lighting equipment attachment member,
wherein when a first instruction is issued, the control unit makes focus adjustment of the lens based on a distance to the projection surface and performs the image projection capability,
when a second instruction is issued, the control unit makes focus adjustment of the lens so as to illuminate an area larger than a projection range in which the image is projected by the image projection capability and performs the illumination capability.

2. The lighting equipment according to claim 1,
wherein when the light source functions as the light source for illumination and an image projection instruction from a user is detected, the control unit controls the image projection unit to project an image.

3. The lighting equipment according to claim 1, further comprising a distance measurement unit capable of measuring the distance to the projection surface.

4. The lighting equipment according to claim 3,
wherein the lens is expandable when a voltage is applied thereto to change the focal length thereof, and
the control unit adjusts the focal length of the lens by applying a voltage according to the distance to the projection surface that is measured by the distance measurement unit.

5. The lighting equipment according to claim 1,
further comprising an imaging unit capable of capturing an image of an instruction action performed by a user,
wherein the control unit performs control corresponding to the instruction action performed by the user based on captured image data outputted from the imaging unit.

6. The lighting equipment according to claim 1,
further comprising an audio output unit capable of outputting audio.

7. The lighting equipment according to claim 1,
wherein the control unit has a function of acquiring image information corresponding to an image to be projected over a network.

8. The lighting equipment according to claim 1,
wherein the control unit has a function of projecting a selection screen that allows a user to select the type of image to be projected.

* * * * *